(12) United States Patent
Woodson et al.

(10) Patent No.: US 8,594,626 B1
(45) Date of Patent: Nov. 26, 2013

(54) POST-PAID WIRELESS SERVICE BALANCE MANAGEMENT

(75) Inventors: Charles Woodson, Peculiar, MO (US); Russell Kindred, Lake Quivira, KS (US); Christina Spieker, Shawnee, KS (US); Daniel Steinel, Lenexa, KS (US); John Gallagher, Overland Park, KS (US); Keith Fenton, Lone Jack, MO (US); Scott Groth, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1087 days.

(21) Appl. No.: 12/061,465

(22) Filed: Apr. 2, 2008

(51) Int. Cl.
*H04M 11/00* (2006.01)

(52) U.S. Cl.
USPC ........... 455/408; 455/406; 455/409; 455/415; 379/114.03; 379/112.04; 379/114.01; 379/114.17; 379/114.2; 379/32.01; 705/30; 705/32; 705/34

(58) Field of Classification Search
USPC ........ 455/406, 415, 409; 379/114.03, 112.04, 379/114.01, 114.17, 114.2, 32.01; 705/30, 705/32, 34
See application file for complete search history.

(56) References Cited

U.S. PATENT DOCUMENTS

| | | | |
|---|---|---|---|
| 5,722,067 A | 2/1998 | Fougnies et al. | |
| 6,226,364 B1 * | 5/2001 | O'Neil | 379/114.2 |
| 7,392,222 B1 * | 6/2008 | Hamilton et al. | 705/39 |
| 2004/0023636 A1 * | 2/2004 | Gurel | 455/405 |
| 2004/0192297 A1 * | 9/2004 | Erskine et al. | 455/432.1 |
| 2008/0154546 A1 * | 6/2008 | Kato et al. | 702/187 |

OTHER PUBLICATIONS

Virgin Mobile USA; Prepaid Cell Phone Plans "Pay As You Go"; http://www.virginmobileusa.com/rates/home.do; 5 pgs.

* cited by examiner

*Primary Examiner* — Nimesh Patel

(57) ABSTRACT

Methods and media for post-paid wireless service balance management are described. In one embodiment, it is determined that a usage threshold has been met based upon a concluded wireless session occurring during a billing period associated with an account. Upon determining that the threshold has been met, enforcement points are provisioned to monitor wireless service usage associated with the account. Further, upon receiving a request for service, and prior to commencing the wireless session, it is determined whether the request exceeds account resources. If the request does not exceed the account resources, the request is allowed. If the request does exceed the account resources, the request is handled based on an account status.

13 Claims, 5 Drawing Sheets

POST-PAID WIRELESS SERVICE BALANCE MANAGEMENT

SUMMARY

The present invention is defined by the claims below. Embodiments of the present invention address at least the issues described herein by providing, among other things, technologies for implementing post-paid wireless service balance management ("PPWSBM"). Embodiments of the present invention have several practical applications in the technical arts, including allowing users to manage their account balances in a post-paid wireless service scheme and allowing other parties (e.g., an authority party or a service provider) to manage service usage of a post-paid wireless customer.

In a first illustrative aspect, it is determined that a usage threshold has been met based upon a concluded wireless session occurring during a billing period associated with an account. Upon determining that the threshold has been met, enforcement points are provisioned to monitor wireless service usage associated with the account. Further, upon receiving a request for service, and prior to commencing the wireless session, it is determined whether the request exceeds account resources. If the request does not exceed the account resources, the request is allowed. If the request does exceed the account resources, the request is handled based on an account status.

In a second illustrative aspect, a provisioning instruction is received to monitor wireless service usage associated with an account having associated resources. The method further includes monitoring for a service request from a mobile device associated with the account. And, upon receiving the service request, and prior to commencing a wireless session, it is determined whether the request exceeds the resources. If the request does not exceed the account resources, the request is allowed. If the request does exceed the account resources, the request is handled based on an account status. The provisioning instruction is received after it has been determined that a usage threshold has been met. The usage threshold is based upon a concluded wireless session occurring during a billing period associated with the account.

In a third illustrative aspect, a billing system is monitored for an indication that a wireless session associated with an account has ended. Upon receiving the indication, the wireless service usage during a billing period is compared with account resources and it is determined that a usage threshold has been met. Enforcement points are provisioned to monitor wireless service usage associated with the account. Upon receiving a request for service from a mobile device associated with the account, it is determined, prior to commencing a new wireless session, whether the request exceeds the account resources. If the request does not exceed the account resources, the request is allowed. If the request does exceed the account resources, the request is handled based on an account status.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
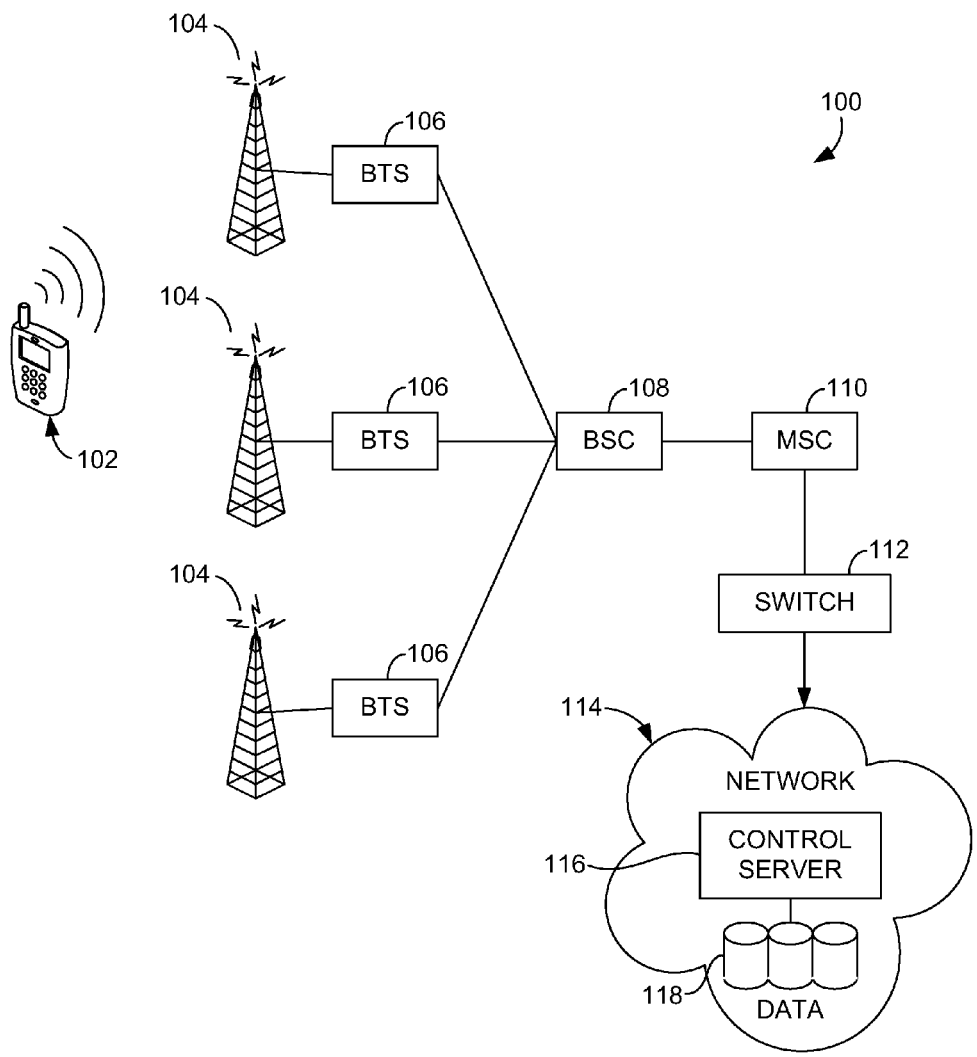
FIG. 1 is a block diagram illustrating an exemplary wireless communications operating environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of the individual steps is explicitly described.

Embodiments of the present invention provide post-paid wireless service balance management ("PPWSBM"). The PPWSBM allows users or other parties to monitor usage associated with a wireless service account. As used herein, a "post-paid wireless service account" refers to an account with a wireless service provider for which the user pays a bill at the end of a billing period for the services used during that period. A typical wireless service contract (including set minutes and other service available within the plan) is included within the definition of "post-paid wireless service account" herein. But post-paid accounts are not limited to just typical wireless service contracts. Instead, post-paid wireless service accounts contemplate various other types of fee arrangements paid on a after-usage basis. For instance, an account that does not include set minutes or other services but that allows a user to pay for services used at the end of a billing period would be included within the definition of post-paid wireless service account. As used herein, the phrase post-paid wireless service account can be contrasted with pre-paid accounts that require a user to pay in advance for subsequent usage. Although embodiments discussed herein reference certain types of wireless networks, it is contemplated by the inventors and within the scope of the present invention that other wireless network technologies (e.g., 4G) may be used in conjunction with embodiments of this invention. Also, PPWSBM is discussed here generally. It is contemplated and within the scope of the present invention that embodiments of PPWSBM may be used in conjunction with various platforms. For instance, in one embodiment, PPWSBM may be used with service control points in an SS7 network. In another embodiment, PPWSBM may be used with policy servers and application servers in an IMS network. In yet another embodiment, PPWSBM may be used as a combination of these two exemplary platforms. These platforms, and others, are contemplated and within the scope of embodiments of the present invention.

Acronyms and Shorthand Notations

Throughout the description of the present invention, several acronyms and shorthand notations are used to aid the understanding of certain concepts pertaining to the associated systems and services. These acronyms and shorthand notations are intended for the purpose of providing an easy methodology of communicating the ideas expressed herein and are in no way meant to limit the scope of the present invention. The following is a list of these acronyms:

| | |
|---|---|
| BSC | Base Station Controller |
| BTS | Base Transceiver System |
| CD-ROM | Compact Disk Read Only Memory |
| DVD | Digital Versatile Discs |
| EEPROM | Electrically Erasable Programmable Read Only Memory |
| IMS | Internet Protocol Multimedia Subsystem |
| LAN | Local Area Network |
| MSC | Mobile Switching Center |
| PDA | Personal Data Assistant |
| PPWSBM | Post-Paid Wireless Service Balance Management |
| RAM | Random Access Memory |
| ROM | Read Only Memory |
| SS7 | Signaling System 7 |
| WAN | Wide Area Network |

Further, various technical terms are used throughout this description. An illustrative resource that fleshes out various aspects of these terms can be found in *Newton's Telecom Dictionary* by H. Newton, 22nd Edition (2006).

Embodiments of the present invention may be embodied as, among other things: a method, system, or computer-program product. Accordingly, the embodiments may take the form of a hardware embodiment, a software embodiment, or an embodiment combining software or hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, a routing component, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Before engaging in a discussion of the details of the functionality of various components, an exemplary overview discussion will be presented to help illustrate the functionality of exemplary embodiments. PPWSBM is used to allow parties to manage and monitor the service usage associated with a wireless account. For instance, a user having a wireless account may choose to be enrolled in the balance management system in order to avoid unexpected charges. In this example, assume the user has a typical wireless service contract with 400 minutes that can be used any time and unlimited minutes during nights (e.g., after 7:00 pm) and weekends. Other services may also be included (e.g., text messaging, movie downloading, ring tones, etc.). But for the sake of simplicity in this example, just the minutes will be discussed. Each billing period, assuming the user's service usage stays within the resources allotted, the user will have a consistent payment due. For budgeting purposes, this allows the user to anticipate the costs associated with the wireless service. But if the user inadvertently exceeds the resources allotted for the account, the user may be presented with unanticipated charges in excess of the typical billing period payment. In order to avoid this scenario, the user may wish to enroll in the post-paid balance management.

Embodiments of the present invention contemplate various implementations for the balance management. For instance, in one example, the user may be notified upon exceeding the allotted resources (e.g., minutes, text messages, movie downloads, ring tones, etc.). Stated differently, when the user exceeds the allotted 400 anytime minutes during a billing period, in this embodiment, the user will be notified (e.g., by text message, voicemail, in-call voice notification, email, etc.). Thus, the user will know the account has exceeded its associated resources for a given billing period and the user will be in a position to anticipate additional charges if the user continues to service usage during the billing period. Or, the user may wish to avoid the additional charges. In this case, the user could simply choose to limit calling to the nights and weekends times that are unlimited. In another embodiment, the user's service may choose to have services automatically limited upon exceeding the resources allotted to the account. This would ensure that the user's eventual charges for the billing period are at, or at least very near, the user's anticipated charges for that billing period. For instance, here, the wireless service provider could limit service availability to the user's mobile device to just nights and weekends. Although these examples are discussed in the context of calling minutes and associated service plans, other wireless functionality could be used in conjunction with post-paid wireless service balance management. For instance, where a user has an allotted number of text messages during a billing period, the online service provider may notify the user or reject text messages once the number has been reached. Or, where the user has a dollar amount of ordinary discretionary spending associated with the account (e.g., for ring tones, movies, music, etc.), the user may be notified upon exceeding the dollar amount. The dollar amount may be set by the user or it may be based upon typical usage associated with the user.

Embodiments of the present invention also contemplate various ways of handling a wireless account once the resources associated with a billing period have been used. For instance, in one embodiment, where the user receives notification that the resources associated with the account have been expended, the user can choose to upgrade the account. For instance, where the user has a $40-per-month account with 400 anytime minutes, the user could choose to upgrade the account to a $50-per-month account with 600 anytime minutes. In this embodiment, the user could perform the upgrade in the middle of the billing session, allowing the user to avoid charges associated with excess usage. For instance, the $10 difference between plans may be much less expensive than paying the per-minute rate for all of the excess anytime minutes used. Thus, the plan upgrade is applied to the account retroactively, giving the user the opportunity to upgrade even after exceeding account resources.

In another embodiment, a wireless account may have an authority user and a subservient user (e.g., a parent and a child; a boss and an employee; etc.). Here, PPWSBM may be used to allow the authority user to ensure the subservient user does not accrue a bill beyond what the authority user anticipated. Like the previous example, users here may have a variety of post-paid service plans including an allotted number of anytime minutes, free nights and weekends, an allotted number of text messages, an allotted number of ring tones, etc. But for simplicity purposes in the example, it is assumed here that the authority and subservient users have a typical wireless service contract with 400 anytime minutes and unlimited nights and weekends. In a typical authority/subservient wireless service relationship, the authority is the party responsible for the plan and the authority allows the subservient user to use a mobile device associated with the plan (i.e., an authorized user). In some circumstances, the authority user may pay the bill for use by the subservient user. In other circumstances, the subservient user may be responsible for the bill, but the authority figure can monitor the amount. In yet other circumstances, the authority user and the subservient user may share responsibilities. In any event, both parties are associated with the wireless service account and the authority user maintains an authority role over the account.

In this example, the authority user can choose the configuration for the PPWSBM. For instance, the authority figure could choose to shut out-of-plan (e.g., anytime minutes) service off once the subservient user has exceeded the resources for a given billing period. In an embodiment, the in-plan services may remain available to the subservient user. The authority figure could also choose to just be notified, as discussed in the previous example, when the subservient user exceeds the resources. Still further, the authority could upgrade the plan, as previously discussed. Or, the authority user could allow the subservient user to pay down the bill for the billing period. For instance, assuming the subservient user has exceeded the allotted 400 minutes, and assuming the authority user has shut of out-of-plan services, the subservient user could pay down the bill, ensuring that out-of-plan services are again available.

In yet another embodiment, the online service provider could choose to enable PPWSBM for particular users. For instance, where a user has had a difficult time meeting payment obligations, the online service provider may ensure the user adheres to usage within the user's plan by cutting off out-of-plan services (e.g., anytime minutes) once the user has exceeded resources associated with the plan. In this example, the user could be allowed to pay down the bill for the billing period and make the out-of-plan services available again. Or, the service provider could allow the user to upgrade the plan. Thus, it is contemplated and within the scope of the present invention that various configurations of PPWSBM may be used depending upon the circumstances and needs of particular users. Embodiments discussed herein merely provide an exemplary discussion, for overview purposes, of some applications of the present invention. But embodiments of the invention are not limited to any particular configuration discussed herein. Instead, other configurations, or combinations of configurations, are included within the scope of the present invention.

Having provided an exemplary overview discussion of PPWSBM, the various components will be discussed in more detail herein. With reference to FIG. 1, an exemplary wireless telecommunications network environment is depicted. In the environment 100, a user's cellular or mobile phone 102 communicates over established radio frequencies through a cell tower 104 having a base transceiver system (BTS) 106, a number of which are typically connected to a base station controller (BSC) 108. The BSC 108 manages the communication between a number of BTSs 106 and a limited number of mobile phones 102 compatible with the wireless environment 100. The BSC 108 connects to a mobile switching center (MSC) 110 acting as a telephone exchange to handle the mobile phone activity through the associated one or more BSCs 108 while connecting as needed through a telecommunications switch 112 to the public switched telephone network 114 or other data network. The telephone network 114 includes a number of control servers 116 that manage the flow of data signals through the network 114 and connect as needed to a number of databases 118 that include information such as registrations of mobile phones 102 and associated accounts, other airtime credit information such as pin codes and associated account values, and other information.

Figure 2:
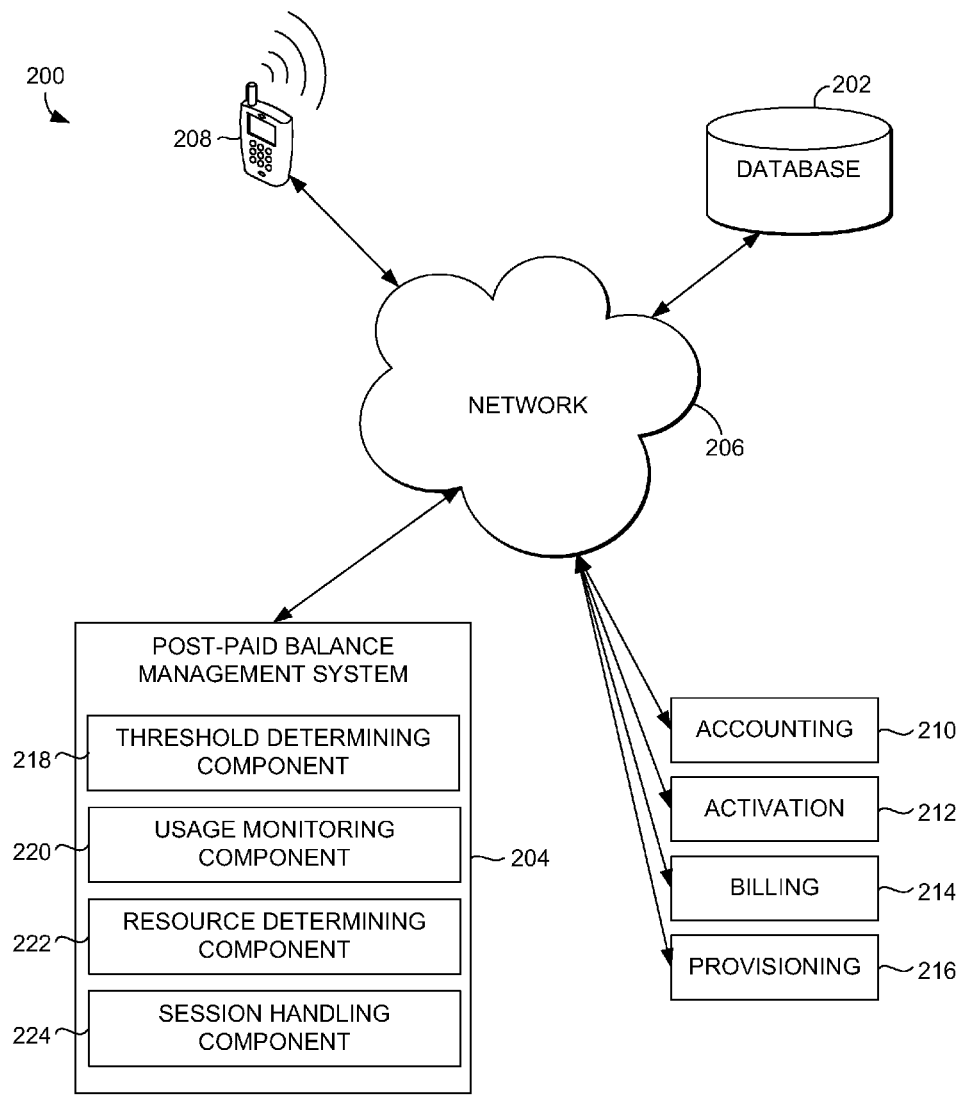
FIG. 2 is a block diagram illustrating an exemplary system for post-paid wireless service balance management, in accordance with an embodiment of the present invention.

Turning now to FIG. 2, a block diagram is provided illustrating an exemplary system for PPWSBM, in accordance with an embodiment of the present invention. A user associated with the particular provisioned mobile device has a pre-established subscription to a particular telecommunications provider, which is associated with an account for the user. The system 200 includes a database 202, a post-paid balance management system 204, and a provisioned mobile device 208 in communication with one another via network 206. In one embodiment, system 200 may also include accounting 210, activation 212, billing 214, and provisioning 216 all in communication with network 206. Network 206 may include, without limitation, a telecommunications network such as network 114 of FIG. 1, one or more local area networks (LANs) or wide area networks (WANs) or combinations thereof. Such individual or combinational networking environments are commonplace in telecommunications, enterprise-wide computer networks, intranets, and the Internet. Accordingly, network 206 is not further described herein.

Database 202 is configured to store information associated with the PPWSBM environment. In one embodiment, such information may include, without limitation, user account information, resource information associated with the user account, billing information associated with the user account, usage information associated with the user account, and various other information associated with the user account and/or PPWSBM. In one embodiment, without limitation, database 202 may be in communication with accounting 210, activation 212, billing 214, and provisioning 216 in order to access information about the user account for use in PPWSBM. For instance, billing 214 may be accessed in order to determine whether usage associated with an account has met a threshold for a billing period. If so, enforcement points may be provisioned using provisioning 216, enabling monitoring of the account. Information stored in database 202 may be configurable and may include various information relevant to PPWSBM. The content and/or volume of such information are not intended to limit the scope of embodiments of the present invention in any way. Further, though illustrated as a single, independent component, database 202 may, in fact, be a plurality of databases (e.g., a database cluster), portions of which may reside on a computing device associated with post-paid balance management system 204, on another external computing device (not shown) or any combination thereof.

Mobile device 208 may include various types of mobile communications devices such as, without limitation, a mobile telephone, a mobile pager, and mobile personal data assistants (PDAs). In one embodiment, mobile device 208 will have been activated and associated with a user account. By way of example, without limitation, mobile device 208 may be a user's mobile telephone that is activated and operational with a user account associated with a particular service provider.

Post-paid balance management system 204 may be a type of computing device, or a combination of computing devices, and includes threshold determining component 218, usage monitoring component 220, resource determining component 222, and session handling component 224. Threshold determining component 218 determines that a usage threshold has been met. In an embodiment, the determination is based upon a concluded wireless session occurring during a billing period associated with a post-paid wireless service account. Stated differently, once a session (e.g., mobile phone call, text message, etc.) has ended, the session, in this embodiment, will be logged into the billing system, e.g. billing 214. Threshold determining component 218 will check the billing system, e.g. billing 214, to determine whether the threshold has been passed. As discussed previously the user's account may have a set of resources associated with it. For instance, using the 400 anytime minute example discussed above, the threshold may be 75% of the user's anytime minutes for a particular billing period. As discussed in more detail below, once the threshold has been met, various functionality will be activated. So here, in this example, threshold determining component 218 may check the billing system to determine whether the usage for the active billing period exceeds 75% of the 400 anytime minutes (i.e., 300 anytime minutes).

Embodiments of the present invention contemplate various threshold determinations including those not limited to a minute percentage analysis. For instance, in one embodiment, the billing system will be accessed and threshold determining component 218 will compare a dollar balance associated with the billing period with a dollar total associated with the account resources. This may be useful, for instance, where the user accesses a lot of online movies, music, and/or ring tones and wants a dollar limit for monthly charges. In another embodiment, the billing system will be accessed to compare a service usage balance associated with the billing period with a usage total associated with the account resources. For instance, assuming the user has 100 text messages associated with the account for a billing period, the threshold may be triggered where the user has reached 75 (or any other percentage) text messages.

Once the billing period usage has met the threshold, in an embodiment, usage monitoring component 220 (also referred to herein as one or more enforcement points) will be provisioned, e.g., with provisioning 216. Usage monitoring component 220 will monitor for a request for service from a mobile device associated with the user account. Stated differently, where the user account has met the threshold usage for a particular billing period, usage monitoring component 220 will be provisioned to monitor usage in the account. Thus, when a user requests service (e.g., makes a phone call, sends a text message, downloads information, etc.), usage monitoring component 220 will, in one embodiment, review the request prior to commencing a wireless session for the user.

Resource determining component 222 may be configured to make determinations based upon the request received by usage monitoring component 220. For instance, resource determining component may compare the request with the resources associated with the account to determine whether the request exceeds the set of resources associated with the account. Stated differently, using the 400 anytime minute example, where the user has used 410 minutes during a billing period, resource determining component 222 will, upon receiving a call request from the user, determine that the request exceeds the resources associated with the account.

Where the request does exceed the resources, it will be handled by session handling component 224 as discussed below. On the other hand, where the request does not exceed the resources associated with the account, the request will be allowed and a wireless session will be commenced.

Session handling component 224 handles requests that exceed resources associated with the account. Thus, the request is handled based on a status associated with the account. For instance, where the request is for calling time and the user has exceeded the calling time for the billing session, session handling component 224 may determine that the user should be notified that the call exceeds the resources associated with the user's account (e.g., by voice, text message, email, etc.). As discussed above, in one example, the account status will indicate to session handling component 224 that the request should be allowed after notification is given whether it is an in-plan service or out-of-plan service. For instance, even if it is a weekday call, and even if the user has accumulated 410 anytime minutes, the call will be allowed after notifying the user. In another example, the status of the account may indicate to session handling component 224 to reject the request unless it is an in-plan service. For instance, where the call is a week day call, the call will be rejected if the user has accumulated 410 anytime minutes, using the example from above. In yet another example, session handling component 224 may determine that, although the request exceeds resources associated with the account, the request should be allowed because it is in-plan. For instance, the request may be a weekend call in a plan having unlimited nights and weekends.

The above discussion is intended to illustrate implementations of various embodiments of the present invention for exemplary purposes. The above discussion, however, is in no way meant to limit system 200 to a particular configuration. For example, in various embodiments, some components of post-paid balance management system 204 may be present or absent. Thus, it will be understood and appreciated by those having ordinary skill in the art that additional components not shown may also be included with any of system 200, database 202, and post-paid balance management system 204.

Figure 3:
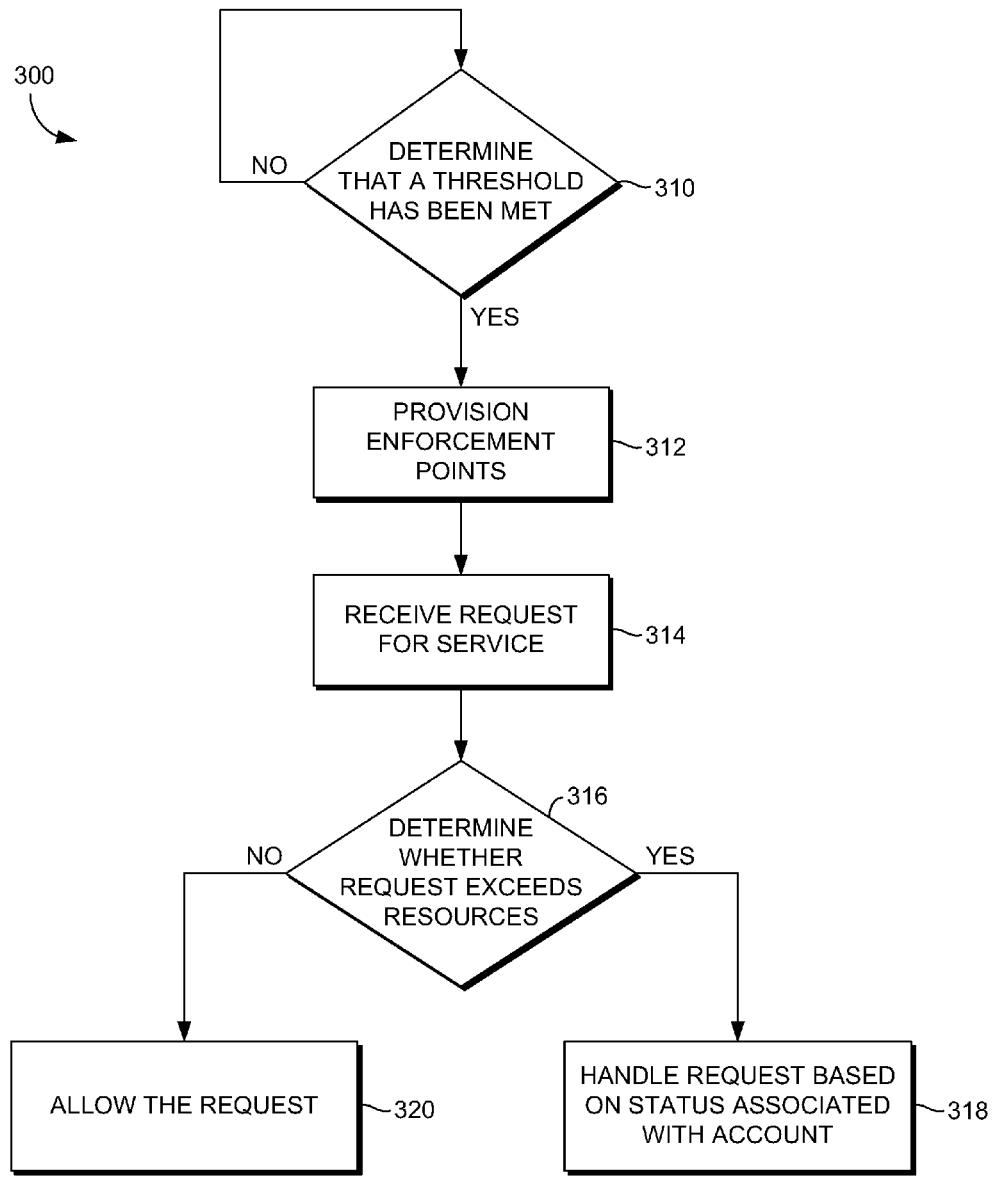
FIG. 3 is a flow diagram illustrating an exemplary method for post-paid wireless service balance management, in accordance with an embodiment of the present invention.

Turning now to FIG. 3, a flow diagram of an exemplary method for PPWSBM, in accordance with an embodiment of the present invention, is illustrated and designated generally as reference numeral 300. Initially, as indicated at step 310, it is determined that a threshold has been met, e.g., by threshold determining component 218 of FIG. 2. By way of example, without limitation, the threshold determination may be based upon a percentage of minute usage, total dollar usage, percentage of service usage (e.g., text messages), etc. In one embodiment, it is helpful to determine a threshold prior to monitoring service requests because it limits the amount of resources needed that must be dedicated to request monitoring. Stated differently, in a post-paid environment, where a high percentage of the time calls can be dealt with in a traditional manner (e.g., not monitored), it preserves resources for other functionality. So, in this embodiment, only where resources have met a certain threshold are enforcement points provisioned to monitor requests.

If the threshold has been met, the enforcement points are provisioned as indicated at step 312. As will be understood and appreciated by those having skill in the art, different enforcement points may be used depending upon the type of service requested. For instance, a wireless call may involve monitoring a one enforcement point, while text messaging may involve monitoring at another enforcement point. Various enforcement points are contemplated and within the scope of the present invention.

At step 314, a request for service is received. For example, the request may be a request to place a wireless call, a request to send and/or receive a text message, a request to access the Internet, a request to download a ring tone, movie, or song, or any combination of these requests. At step 316, it is determined whether the request exceeds resources. For instance, as previously discussed, where the request is for a wireless call, it is determined whether the account has exceeded its associated minute resources for the active billing period. If so, the request is handled, e.g. by session handling component 224 of FIG. 2, as previously discussed and as illustrated at 318. If the request does not exceed account resources, the request is allowed as shown at 320.

Figure 4:
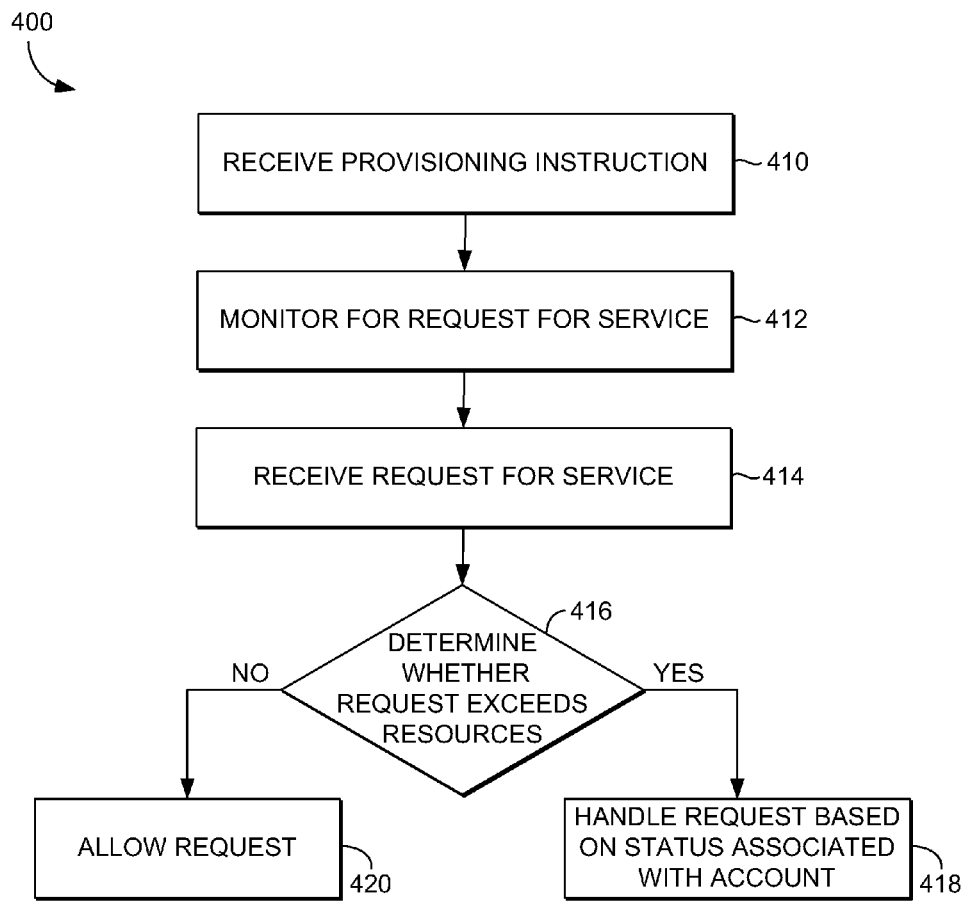
FIG. 4 is a flow diagram illustrating another exemplary method for post-paid wireless service balance management, the method having a different point of view than the method of FIG. 3, in accordance with an embodiment of the present invention.

Turning now to FIG. 4, a flow diagram of another exemplary method for post-paid wireless service balance management, the method having a different point of view than the method of FIG. 3, in accordance with an embodiment of the present invention, is illustrated and designated generally as reference numeral 400. At step 410, a provisioning instruction is received, e.g., by resource determining component 222 of FIG. 2. For example, in one embodiment, the provisioning instruction might include an instruction to monitor usage associated with a particular account. In another embodiment, the instruction may also include information as to the status of the account (e.g., distinguishing in-plan services from out-of-plan services). At step 412, the enforcement points monitor for a request for service associated with the account and at step 414 a request for service is received. As before in FIG. 3, and as illustrated at step 416, it is determined whether the request exceeds the resources associated with the account. If the request for service does not exceed the resources associated with the account, the request is allowed as illustrated at step 420. Conversely, if the request for service does exceed the resources associated with the account, the request is handled, e.g., by session handling component 224 of FIG. 2, as previously discussed and as illustrated at step 418.

Figure 5:
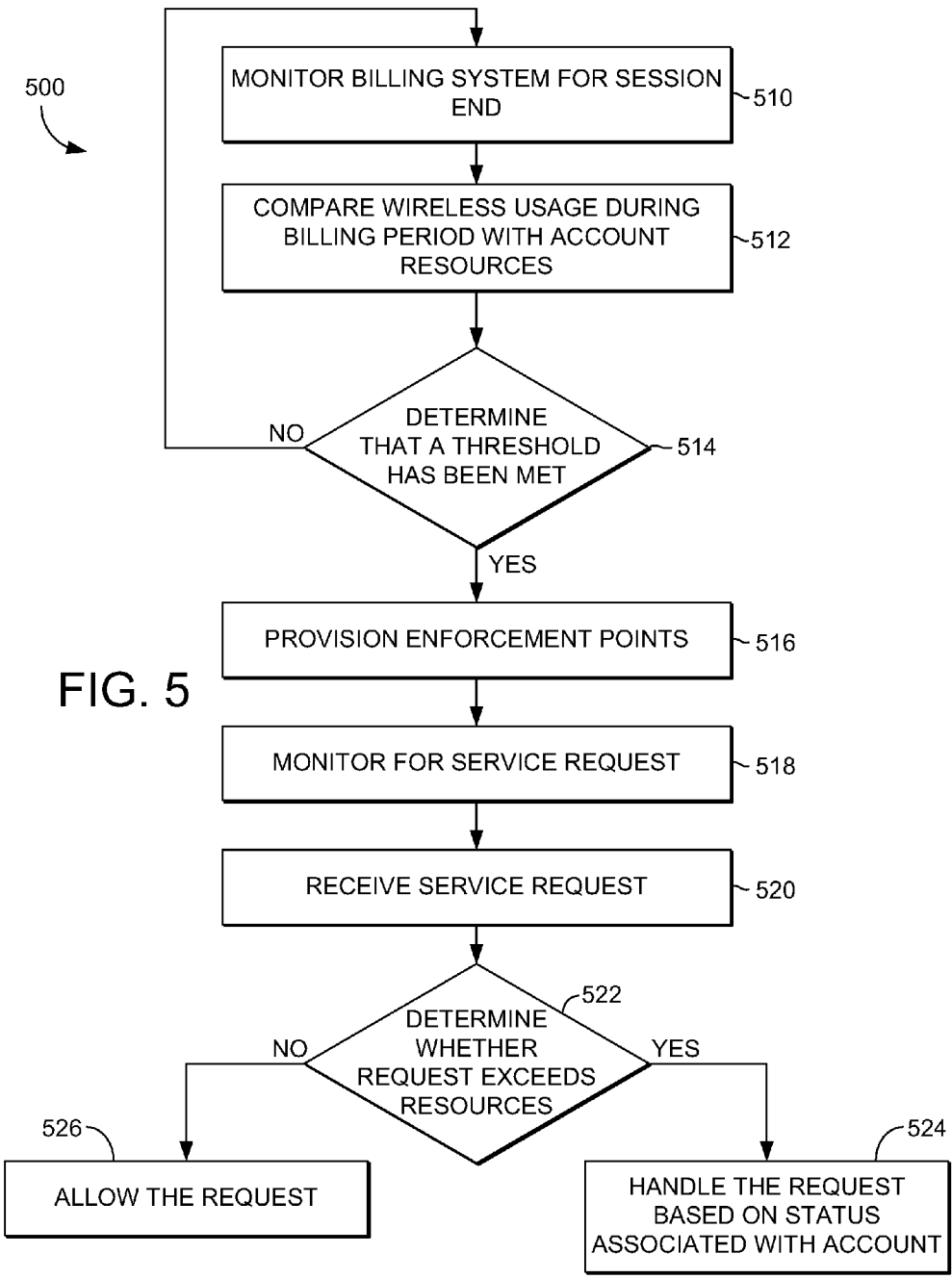
FIG. 5 is a flow diagram illustrating yet another exemplary method for post-paid wireless service balance management, the method having different steps than the method of FIG. 3, in accordance with an embodiment of the present invention.

Turning now to FIG. 5, a flow diagram of yet another exemplary method for PPWSBM, the method having different steps than the method of FIG. 3, in accordance with an embodiment of the present invention, is illustrated and designated generally as reference numeral 500. Initially, as indicated at step 510 the billing system is monitored for a session end. For instance, a session may end where a wireless call is completed. Or, as another example, a session may end when a text message is sent or received. As yet another example, a session may end where an item is downloaded such as a movie, music, or a ring tone. In one embodiment, where a session ends, the effect of the session will be reflected in the billing system in association with a user's account. As illustrated at step 512, the wireless usage during the billing period is compared with account resources. For example, in one embodiment, the account resources may include 400 anytime minutes. At step 512, the wireless usage accumulated in the billing period (e.g., 300 anytime minutes) will be compared with the 400 anytime minutes associated with the account.

At step 514, it is determined whether a threshold has been met. As previously discussed, the threshold may be based on a percentage of minutes, a dollar amount for discretionary spending, a number of text messages, or any other feature included with the account resources. By way of example, the threshold may be met where the billing period anytime minutes used meet or exceed 75% of the total available anytime minutes for the billing period. Thus, where there are 400 anytime minutes available, the threshold will be met where the user concludes a call and has accumulated at least 300 anytime minutes. If it is determined that the threshold has not been met, then the billing system continues to be monitored as illustrated at step 510. But if it is determined that the threshold has been met, enforcement points are provisioned as illustrated at step 516 (e.g., the enforcement points are configured to monitor for usage associated with the account that has met the threshold).

At step 518, service requests are monitored for, e.g., by usage monitoring component 220 of FIG. 2. Where a service request is received at step 520, it is determined whether the request exceeds resources associated with the account, as illustrated at step 522. As previously discussed, if the service request does exceed the resources associated with the account, the request is handled, e.g., by session handling component 224 of FIG. 2, as illustrated at step 524. On the other hand, if the request does not exceed account resources, the request is allowed and a session is commenced, as illustrated at step 526.

The present invention has been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more tangible computer-storage media having computer-useable instructions embodied thereon for performing a method of post-paid wireless service balance management, the method comprising:

allotting an amount of post-paid usage resources to a post-paid wireless service account ("account") for a billing period associated with the account;

monitoring a current amount of usage for the billing period, wherein the monitoring includes
A) determining that a wireless session has concluded,
B) upon determining that the wireless session has concluded, then determining the current amount of usage based on an amount of usage at the end of the concluded wireless session, and
C) determining whether the current amount of usage meets a threshold amount of post-paid usage prior to exceeding the allotted amount of post-paid resources;

upon determining that the threshold amount of post-paid usage has been met, provisioning an enforcement point that monitors requests for service associated with the account and providing an option to upgrade the account in the middle of a billing session to avoid charges associated with excess usage, wherein upon upgrading the account, the account is associated with an upgraded set of mobile-phone minutes or messages that are applied retroactively during the billing period;

at the provisioned enforcement point, subsequent to determining that the threshold amount of post-paid usage has been met, upon receiving a request for service from a mobile device associated with the account, and prior to commencing a wireless session in response to the request, determining whether the request exceeds the allotted amount of post-paid resources;

upon determining that the request exceeds the allotted amount of post-paid resources associated with the account:

A) determining a status associated with the account, wherein the status indicates how the request should be handled when the request exceeds the allotted amount of post-paid resources associated with the account, and B) handling the request based on the status associated with the accounts;

C) wherein the account has associated therewith an authority user and a subservient user, wherein the authority user elects to enable the post-paid wireless service balance management on behalf of the subservient user, providing a set of instructions regarding handling of requests received after the threshold has been met, and wherein the instructions include at least one of A) an instruction to reject all but in-plan requests that exceed the set of resources associated with the account, or B) an instruction to notify the authority user of all requests that exceed the set of resources associated with the account and allow all requests.

2. The media of claim 1, wherein determining that the threshold has been met comprises accessing a billing system to compare a minute balance associated with the billing period at the end of the concluded wireless session with a minute total associated with the set of resources.

3. The media of claim 1, wherein determining that the threshold has been met comprises accessing a billing system to compare a dollar balance associated with the billing period at the end of the concluded wireless session with a dollar total associated with the set of resources.

4. The media of claim 1, wherein determining that the threshold has been met comprises accessing a billing system to compare a service usage balance associated with the billing period at the end of the concluded wireless session with a usage total associated with the set of resources.

5. The media of claim 1, wherein handling the request based on the status associated with the account comprises determining that the request is for an in-plan service and allowing the request.

6. The media of claim 1, wherein handling the request based on the status associated with the account comprises determining that the request is for an out-of-plan service and rejecting the request.

7. The media of claim 1, wherein handling the request based on the status associated with the account comprises notifying a user of the mobile device that the request exceeds the set of resources associated with the account and allowing the request.

8. The media of claim 1, wherein a user associated with the account is automatically enrolled in the post-paid wireless service balance management.

9. The media of claim 1, wherein, upon exceeding the set of resources associated with the account, a user associated with the account pays down a bill associated with the billing period, and wherein the account is associated with an upgraded set of resources.

10. One or more tangible computer-storage media having computer-usable instructions embodied thereon for performing a method of post-paid wireless service balance management, the method comprising:

receiving a provisioning instruction to monitor wireless service usage associated with a post-paid wireless service account ("the account") that has an allotted amount of post-paid usage resources associated therewith, and wherein the account has associated therewith an authority user and a subservient user;

monitoring the wireless service usage;

monitoring for a request for a wireless session from a mobile device associated with the account, wherein the monitoring for the request includes A) receiving the request for the wireless session, B) upon receiving the request, prior to commencing a wireless session, determining whether the request exceeds the allotted amount of post-paid usage resources, wherein:

a) when it is determined that the request does not exceed the allotted amount of post-paid usage resources associated with the account, allowing the request, and wherein b) when it is determined that the request exceeds the allotted amount of post-paid usage resources associated with the account, determining a status associated with the account, and handling the request based on the status associated with the account;

wherein the provisioning instruction is received after it has been determined that a current amount of usage has met a threshold amount of post-paid usage at the end of a concluded wireless session occurring during a billing period associated with the account, wherein the threshold amount of post-paid usage has been met prior to exceeding the allotted amount of post-paid resources;

receiving an election from the authority user associated with the account to enable the post-paid wireless service balance management and provide a set of instructions regarding handling of requests received after the threshold has been met on behalf of the subservient user, wherein the instructions include:

A) an instruction to reject all but in-plan requests that exceed the allotted amount of post-paid usage resources associated with the account; and B) an instruction to notify the authority user of all requests that exceed the allotted amount of post-paid usage resources associated with the account and allow all requests; and modifying the account to a different quantity of mobile phone minutes or wireless usage in the middle of a billing session to avoid charges associated with excess usage, wherein upon upgrading the account, the account is associated with an upgraded set of post-paid mobile phone minutes or wireless usage applied retroactively during the billing period.

11. The media of claim 10, wherein determining that the threshold has been met comprises accessing a billing system to compare a minute balance associated with the billing period at the end of the concluded wireless session with a minute total associated with the set of resources and wherein the billing system is accessed to determine whether the threshold has been met at the end of every wireless session.

12. The media of claim 10, wherein determining that the threshold has been met comprises accessing a billing system to compare a minute balance associated with the billing period at the end of the concluded wireless session with a minute total associated with the set of resources, and wherein the billing system is accessed to determine whether the threshold has been met at the end of every wireless session.

13. One or more tangible computer-storage media having computer-usable instructions embodied thereon for performing a method of post-paid wireless service balance management, the method comprising:

monitoring a billing system for an indication that a wireless session associated with a post-paid wireless service account ("the account") has concluded, wherein the account has associated therewith an authority user and a user;

upon receiving the indication, comparing a current amount of wireless service usage during a billing period associated with the account with an allotted amount of post-paid resources associated with the account, wherein the current amount of usage is based on an amount of usage at the end of the concluded wireless session;

determining that a threshold amount of post-paid usage has been met prior to exceeding the allotted amount of post-paid resources;

as a result of having met the threshold amount of post-paid usage, provisioning an enforcement point to monitor wireless service usage associated with the account and providing an option to upgrade the account in the middle of a billing session to avoid charges associated with excess usage, wherein upon upgrading the account, the account is associated with an upgraded amount of post-paid resources applied retroactively during the billing period;

at the enforcement point, monitoring for a request for a wireless session from a mobile device associated with the account;

upon receiving the request for the wireless session, determining, prior to commencing a new wireless session, that a dollar balance based on the wireless service usage during the billing period exceeds a threshold dollar amount associated with the allotted amount of post-paid resources for the account during the billing period;

upon determining that the dollar balance exceeds the threshold dollar amount associated with the allotted amount of post-paid resources associated with the account:

A) determining a status associated with the account, wherein the status indicates how the request should be handled when the request exceeds the allotted amount of post-paid resources associated with the account, and B) handling the request based on the status associated with the account, wherein the authority user elects to enable the post-paid wireless service balance management on behalf of the user, providing a set of instructions regarding handling of requests received after the threshold has been met, and wherein the instructions include at least one of:

a) an instruction to reject all but in-plan requests that exceed the set of resources associated with the account; and b) an instruction to notify the authority user of all requests that exceed the set of resources associated with the account and allow all requests;

wherein handling the request includes notifying the user that the dollar balance exceeds the threshold dollar amount associated with the allotted amount of post-paid resources; and because the dollar balance exceeds the threshold dollar amount associated with the allotted amount of post-paid resources, reviewing subsequent requests for service during a remainder of the billing period prior to commencing subsequent wireless sessions, and only commencing the subsequent wireless sessions after sending notifications to the user that the threshold dollar amount has been exceeded.

* * * * *